US012707266B2

(12) United States Patent
Banerjee et al.

(10) Patent No.: US 12,707,266 B2
(45) Date of Patent: Aug. 11, 2026

(54) PROTECTION OF A WIRELESS ACCESS POINT (AP) FROM REPEATED ATTACKS

(71) Applicant: QUALCOMM Incorporated, San Diego, CA (US)

(72) Inventors: Sourabh Banerjee, Hyderabad (IN); Ravi Paluri, Hyderabad (IN); Sandip Homchaudhuri, San Jose, CA (US); James Simon Cho, Stateline, NV (US); Viswanath Kraleti, Hyderabad (IN)

(73) Assignee: QUALCOMM Incorporated, San Diego, CA (US)

( * ) Notice: Subject to any disclaimer, the term of this patent is extended or adjusted under 35 U.S.C. 154(b) by 259 days.

(21) Appl. No.: 18/185,030

(22) Filed: Mar. 16, 2023

(65) Prior Publication Data

US 2024/0314567 A1 Sep. 19, 2024

(51) Int. Cl.

| | |
|---|---|
| ***H04L 29/06*** | (2006.01) |
| ***H04W 12/06*** | (2021.01) |
| ***H04W 12/122*** | (2021.01) |
| ***H04W 48/04*** | (2009.01) |

(52) U.S. Cl.

CPC ......... *H04W 12/122* (2021.01); *H04W 12/06* (2013.01); *H04W 48/04* (2013.01)

(58) Field of Classification Search

CPC .... H04W 12/122; H04W 12/06; H04W 48/04
See application file for complete search history.

(56) References Cited

U.S. PATENT DOCUMENTS 8,200,582 B1 * 6/2012 Zhu ...................... G06Q 20/382 705/64
8,654,701 B2 2/2014 Kazmi et al.
2014/0342754 A1 * 11/2014 Liu ...................... G01S 5/0252 455/456.2
2016/0029217 A1 * 1/2016 Yoo ...................... H04L 63/107 726/4

(Continued)

FOREIGN PATENT DOCUMENTS

CN 113154623 A 7/2021

OTHER PUBLICATIONS

International Search Report and Written Opinion—PCT/US2024/019137—ISA/EPO—Jun. 12, 2024.

(Continued)

*Primary Examiner* — Wasika Nipa
(74) *Attorney, Agent, or Firm* — Patterson & Sheridan LLP

(57) ABSTRACT

This disclosure provides methods, components, devices and systems for performing actions to protect a wireless access point (AP) from repeated incorrect security credential input attacks. For example, a combination of techniques are implemented to block a wireless station (STA) from submitting innumerable number of incorrect security credential inputs to connect to the wireless AP by using embargo lists to block the wireless STA media access control (MAC) address after N number of consecutive unsuccessful attempts to connect to the wireless AP, using telescopic delays to make it progressively harder for the wireless STA to attack (that is, repeatedly submit incorrect security credential inputs) at regular short intervals, and/or determining position of the wireless STA of the attacker and then block attacks from all wireless STAs at the determined location.

22 Claims, 11 Drawing Sheets

(56) References Cited

U.S. PATENT DOCUMENTS

2021/0282016 A1* 9/2021 Mohan ................ H04L 63/1458

OTHER PUBLICATIONS

Laravel Daily: "Laravel Too Many Login Attempts: Restrict and Customize", The Wayback Machine, Jan. 16, 2019, pp. 1-5, Jan. 28, 2023, XP093165055, pp. 1, 2.

Lins F.A.A., et al., "Security Requirements and Solutions for IoT Gateways: A Comprehensive Study", IEEE Internet of Things Journal, IEEE, USA, vol. 8, No. 11, Jun. 1, 2021, pp. 8667-8679, Nov. 30, 2020, XP011855532, Section B, p. 8670—right-hand column.

* cited by examiner

Allow List 700

| Allowed MAC Addresses 710 | Locations 720 |
|---|---|
| MAC-y | yy.yy |
| MAC-d | dd.dd |
| ⋮ | |

*Figure 7*

Embargo List 800

| Banned MAC Addresses 810 | Locations 820 |
|---|---|
| MAC-x | xx.xx |
| MAC-z | zz.zz |

*Figure 8*

PROTECTION OF A WIRELESS ACCESS POINT (AP) FROM REPEATED ATTACKS

TECHNICAL FIELD

This disclosure relates generally to wireless communication, and more specifically, to protection of a wireless access point (AP) from repeated attacks.

DESCRIPTION OF THE RELATED TECHNOLOGY

A wireless local area network (WLAN) may be formed by one or more wireless access points (APs) that provide a shared wireless communication medium for use by multiple client devices also referred to as wireless stations (STAs). The basic building block of a WLAN conforming to the Institute of Electrical and Electronics Engineers (IEEE) 802.11 family of standards is a Basic Service Set (BSS), which is managed by an AP. Each BSS is identified by a Basic Service Set Identifier (BSSID) that is advertised by the AP. An AP periodically broadcasts beacon frames to enable any STAs within wireless range of the AP to establish or maintain a communication link with the WLAN.

In some WLANs, as new radio (NR) 5G is offering high data speeds, usage of mobile phones and electronic gadgets as hotspots or usage of exclusive wireless APs is on the rise. Also, with people always having their wireless STAs connected to the wireless APs or the hotspots in order to be online, the security of the wireless APs and the hotspots plays an important role to enable secure wireless communications. Currently, when an attacker using a wireless STA repeatedly tries to break into a network identified by a random service set identifier (SSID) and associated with a wireless AP to connect to the network, there is no way to notify an administrator of the wireless AP of the break-in attempt by the attacker. In addition, depending on the nature of the attack, detection and prevention of the break-in attempt can be difficult.

SUMMARY

The systems, methods and devices of this disclosure each have several innovative aspects, no single one of which is solely responsible for the desirable attributes disclosed herein.

One innovative aspect of the subject matter described in this disclosure can be implemented in a wireless access point (AP). The wireless AP may include at least one memory and at least one processor communicatively coupled with the at least one memory. The at least one processor may be operable to cause the wireless AP to receive multiple incorrect security credential inputs from a wireless station (STA) to connect to the wireless AP where the multiple incorrect security credential inputs may be associated with one or more media access control (MAC) addresses of the wireless STA, detect that a number of consecutive incorrect security credential inputs exceeds a threshold, add the one or more MAC addresses to an embargo list including a list of banned MAC addresses based on the number of consecutive incorrect security credential inputs exceeding the threshold, and perform one or more actions to block one or more other security credential inputs from the wireless STA to connect to the wireless AP.

Another innovative aspect of the subject matter described in this disclosure can be implemented in a method for wireless communication. The method may include receiving multiple incorrect security credential inputs from a wireless STA to connect to a wireless AP, where the multiple incorrect security credential inputs may be associated with one or more MAC addresses of the wireless STA; detecting that a number of consecutive incorrect security credential inputs exceeds a threshold; adding the one or more MAC addresses to an embargo list including a list of banned MAC addresses based on the number of consecutive incorrect security credential inputs exceeding the threshold; and performing one or more actions to block one or more other security credential inputs from the wireless STA to connect to the wireless AP.

In some examples, the methods and wireless communication devices may include disabling an input field on the wireless station to prevent entry of the one or more other security credential inputs to connect to the wireless AP.

In some examples, the methods and wireless communication devices may include generating an alert tone based on the number of consecutive incorrect security credential inputs exceeding the threshold.

In some examples, the methods and wireless communication devices may include transmitting an alert message to a wireless device of an administrator of the wireless AP based on the number of consecutive incorrect security credential inputs exceeding the threshold where the alert message may include data associated with the number of consecutive incorrect security credential inputs.

Details of one or more implementations of the subject matter described in this disclosure are set forth in the accompanying drawings and the description below. Other features, aspects, and advantages will become apparent from the description, the drawings and the claims. Note that the relative dimensions of the following figures may not be drawn to scale.

BRIEF DESCRIPTION OF THE DRAWINGS

FIG. 7 shows an allow list including a list of allowed media access control (MAC) addresses of wireless stations (STAs) and corresponding locations of wireless STAs.

FIG. 8 shows an embargo list including a list of banned MAC addresses of wireless STAs and corresponding locations of wireless STAs.

Like reference numbers and designations in the various drawings indicate like elements.

DETAILED DESCRIPTION

Figure 1:
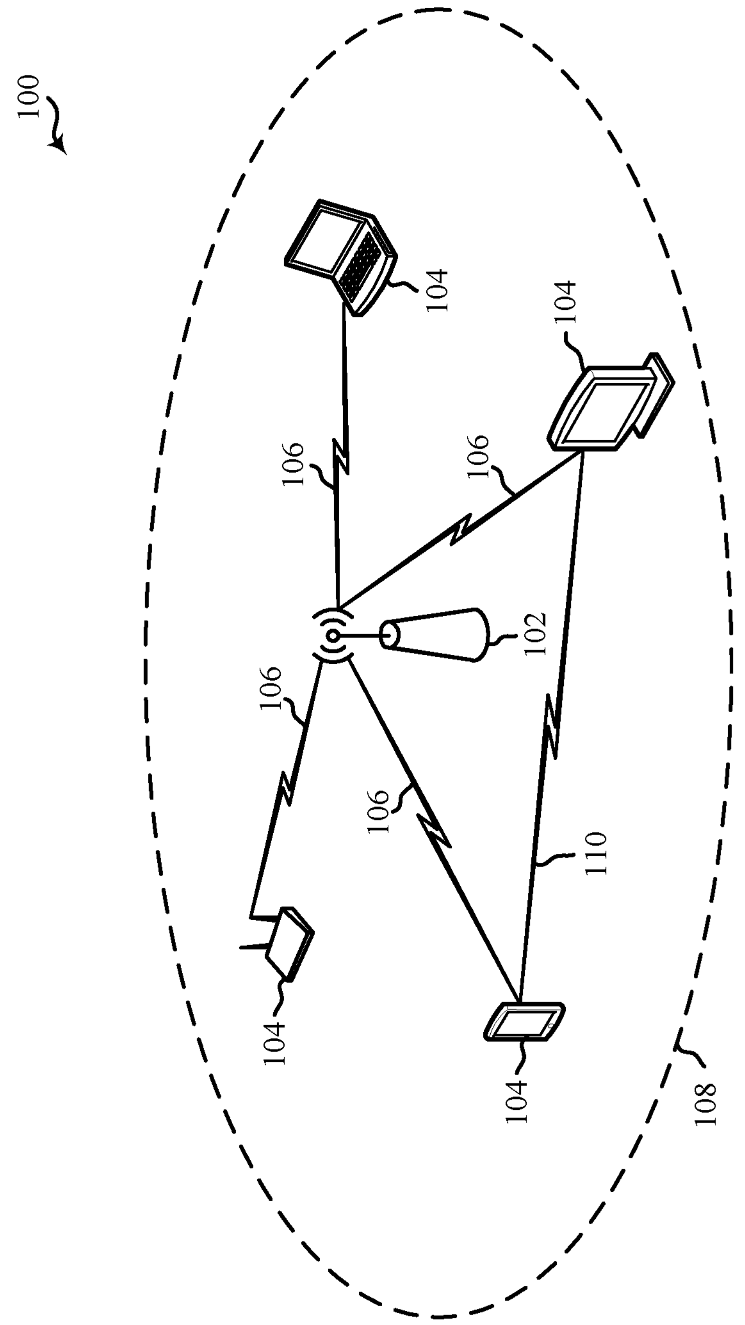
FIG. 1 shows a pictorial diagram of an example wireless communication network.

The following description is directed to some particular examples for the purposes of describing innovative aspects of this disclosure. However, a person having ordinary skill in the art will readily recognize that the teachings herein can be applied in a multitude of different ways. Some or all of the described examples may be implemented in any device, system or network that is capable of transmitting and receiving radio frequency (RF) signals according to one or more of the Institute of Electrical and Electronics Engineers (IEEE) 802.11 standards, the IEEE 802.15 standards, the Bluetooth® standards as defined by the Bluetooth Special Interest Group (SIG), or the Long Term Evolution (LTE), 3G, 4G or 5G (New Radio (NR)) standards promulgated by the 3$^{rd}$ Generation Partnership Project (3GPP), among others. The described examples can be implemented in any device, system or network that is capable of transmitting and receiving RF signals according to one or more of the following technologies or techniques: code division multiple access (CDMA), time division multiple access (TDMA), frequency division multiple access (FDMA), orthogonal FDMA (OFDMA), single-carrier FDMA (SC-FDMA), spatial division multiple access (SDMA), rate-splitting multiple access (RSMA), multi-user shared access (MUSA), single-user (SU) multiple-input multiple-output (MIMO) and multi-user (MU)-MIMO. The described examples also can be implemented using other wireless communication protocols or RF signals suitable for use in one or more of a wireless personal area network (WPAN), a wireless local area network (WLAN), a wireless wide area network (WWAN), a wireless metropolitan area network (WMAN), or an internet of things (IOT) network.

Various aspects relate generally to wireless communication. Some aspects more specifically relate to protection of a wireless access point (AP) from repeated attacks. As new radio (NR) 5G is offering high data speeds and increased capacity, usage of mobile phones and electronic gadgets as hotspots, or usage of exclusive wireless access points (APs), is on the rise. Also, as wireless stations (STAs) increasingly become continuously connected to the wireless APs or the hotspots in order to maintain service to the wireless STAs, the security of the wireless APs and the hotspots plays an important role in secure wireless communications.

When an attacker using a wireless STA repeatedly tries to break into a network identified by a random service set identifier (SSID) and associated with a wireless AP, to connect to the network, it may be difficult to detect such an attack and/or to notify an administrator of the wireless AP of the break-in attempt by the attacker. For example, a wireless STA may provide multiple incorrect security credential inputs to the wireless AP from one or more medium access control (MAC) addresses, in an effort to mask that the same wireless STA is repeatedly trying to break into the network associated with the wireless AP. In this scenario, the use of varied MAC addresses by the wireless STA may make it difficult for the wireless AP to detect that an attack is occurring, to take preventative action to secure the wireless AP, and/or to notify an administrator that an attack is occurring or the nature of the attack.

Accordingly, to protect the wireless AP from such attacks, techniques described herein may detect possible attacks based on repeated attempts to access the wireless AP, may notify the administrator of the wireless AP of the break-in attempt by the wireless STA, and/or may temporarily block the wireless STA from submitting further access attempts to the wireless AP. For example, a combination of techniques may be implemented to block the wireless STA from submitting a limitless number of incorrect security credential inputs to connect to the wireless AP, such as by using embargo lists to block the wireless STA MAC addresses after N number of consecutive unsuccessful attempts to connect to the wireless AP, using telescopic delays to make it progressively harder for the wireless STA to attack (by repeatedly submitting incorrect security credential inputs) at regular short intervals, and/or determining a position of the wireless STA and then blocking attacks from wireless STAs at the determined location.

Particular aspects of the subject matter described in this disclosure can be implemented to realize one or more of the following potential advantages. In some examples, the described techniques can be used to at least temporarily block attempts to submit the incorrect security credential inputs from the wireless STA by the attacker, which may conserve processing resources of the wireless AP that would otherwise be consumed as a result of additional attempts and/or which may help to secure the wireless AP. Additionally, or alternatively, in some examples, some techniques described here may alert the administrator of the wireless AP of these repeated attacks so that the administrator of the wireless AP is able to take a corrective action, which may help to secure the wireless AP. In some examples, the techniques described herein may provide for faster or more accurate detection of attacks, which may help to secure the wireless AP and/or reduce consumption of processing resources of the wireless AP relative to a prolonged attack.

EXAMPLE WIRELESS COMMUNICATION NETWORK

FIG. 1 shows a block diagram of an example wireless communication network 100. According to some aspects, the wireless communication network 100 can be an example of a WLAN such as a Wi-Fi network (and will hereinafter be referred to as WLAN 100). For example, the WLAN 100 can be a network implementing at least one of the IEEE 802.11 family of wireless communication protocol standards (such as that defined by the IEEE 802.11-2020 specification or amendments thereof including, but not limited to, 802.11ay, 802.11ax, 802.11az, 802.11ba, 802.11bd, 802.11be, 802.11bf, and the 802.11 amendment associated with Wi-Fi 8). The WLAN 100 may include numerous wireless communication devices such as a wireless AP 102 and multiple wireless STAs 104. While only one AP 102 is shown in FIG. 1, the WLAN network 100 also can include multiple APs 102. AP 102 shown in FIG. 1 can represent various different types of APs including but not limited to enterprise-level APs, single-frequency APs, dual-band APs, standalone APs, software-enabled APs (soft APs), and multi-link APs. The coverage area and capacity of a cellular network (such as LTE, 5G NR, etc.) can be further improved by a small cell which is supported by an AP serving as a miniature base station. Furthermore, private cellular networks also can be set up through a wireless area network using small cells.

Each of the STAs 104 also may be referred to as a mobile station (MS), a mobile device, a mobile handset, a wireless handset, an access terminal (AT), a user equipment (UE), a subscriber station (SS), or a subscriber unit, among other examples. The STAs 104 may represent various devices such as mobile phones, personal digital assistant (PDAs), other handheld devices, netbooks, notebook computers, tablet computers, laptops, chromebooks, extended reality (XR) headsets, wearable devices, display devices (for example, TVs (including smart TVs), computer monitors, navigation systems, among others), music or other audio or stereo devices, remote control devices ("remotes"), printers, kitchen appliances (including smart refrigerators) or other household appliances, key fobs (for example, for passive keyless entry and start (PKES) systems), Internet of Things (IoT) devices, and vehicles, among other examples. The various STAs 104 in the network are able to communicate with one another via the AP 102.

A single AP 102 and an associated set of STAs 104 may be referred to as a basic service set (BSS), which is managed by the respective AP 102. FIG. 1 additionally shows an example coverage area 108 of the AP 102, which may represent a basic service area (BSA) of the WLAN 100. The BSS may be identified or indicated to users by a service set identifier (SSID), as well as to other devices by a basic service set identifier (BSSID), which may be a medium access control (MAC) address of the AP 102. The AP 102 may periodically broadcast beacon frames ("beacons") including the BSSID to enable any STAs 104 within wireless range of the AP 102 to "associate" or re-associate with the AP 102 to establish a respective communication link 106 (hereinafter also referred to as a "Wi-Fi link"), or to maintain a communication link 106, with the AP 102. For example, the beacons can include an identification or indication of a primary channel used by the respective AP 102 as well as a timing synchronization function for establishing or maintaining timing synchronization with the AP 102. The AP 102 may provide access to external networks to various STAs 104 in the WLAN via respective communication links 106.

To establish a communication link 106 with an AP 102, each of the STAs 104 is configured to perform passive or active scanning operations ("scans") on frequency channels in one or more frequency bands (for example, the 2.4 GHz, 5 GHz, 6 GHz or 60 GHz bands). To perform passive scanning, a STA 104 listens for beacons, which are transmitted by respective APs 102 at a periodic time interval referred to as the target beacon transmission time (TBTT) (measured in time units (TUs) where one TU may be equal to 1024 microseconds (μs)). To perform active scanning, a STA 104 generates and sequentially transmits probe requests on each channel to be scanned and listens for probe responses from APs 102. Each STA 104 may identify, determine, ascertain, or select an AP 102 with which to associate in accordance with the scanning information obtained through the passive or active scans, and to perform authentication and association operations to establish a communication link 106 with the selected AP 102. The AP 102 assigns an association identifier (AID) to the STA 104 at the culmination of the association operations, which the AP 102 uses to track the STA 104.

As a result of the increasing ubiquity of wireless networks, a STA 104 may have the opportunity to select one of many BSSs within range of the STA or to select among multiple APs 102 that together form an extended service set (ESS) including multiple connected BSSs. An extended network station associated with the WLAN 100 may be connected to a wired or wireless distribution system that may allow multiple APs 102 to be connected in such an ESS. As such, a STA 104 can be covered by more than one AP 102 and can associate with different APs 102 at different times for different transmissions. Additionally, after association with an AP 102, a STA 104 also may periodically scan its surroundings to find a more suitable AP 102 with which to associate. For example, a STA 104 that is moving relative to its associated AP 102 may perform a "roaming" scan to find another AP 102 having more desirable network characteristics such as a greater received signal strength indicator (RSSI) or a reduced traffic load.

In some cases, STAs 104 may form networks without APs 102 or other equipment other than the STAs 104 themselves. One example of such a network is an ad hoc network (or wireless ad hoc network). Ad hoc networks may alternatively be referred to as mesh networks or peer-to-peer (P2P) networks. In some cases, ad hoc networks may be implemented within a larger wireless network such as the WLAN 100. In such examples, while the STAs 104 may be capable of communicating with each other through the AP 102 using communication links 106, STAs 104 also can communicate directly with each other via direct wireless communication links 110. Additionally, two STAs 104 may communicate via a direct communication link 110 regardless of whether both STAs 104 are associated with and served by the same AP 102. In such an ad hoc system, one or more of the STAs 104 may assume the role filled by the AP 102 in a BSS. Such a STA 104 may be referred to as a group owner (GO) and may coordinate transmissions within the ad hoc network. Examples of direct wireless communication links 110 include Wi-Fi Direct connections, connections established by using a Wi-Fi Tunneled Direct Link Setup (TDLS) link, and other P2P group connections.

The APs 102 and STAs 104 may function and communicate (via the respective communication links 106) according to one or more of the IEEE 802.11 family of wireless communication protocol standards. These standards define the WLAN radio and baseband protocols for the PHY and MAC layers. The APs 102 and STAs 104 transmit and receive wireless communications (hereinafter also referred to as "Wi-Fi communications" or "wireless packets") to and from one another in the form of PHY protocol data units (PPDUs). The APs 102 and STAs 104 in the WLAN 100 may transmit PPDUs over an unlicensed spectrum, which may be a portion of spectrum that includes frequency bands traditionally used by Wi-Fi technology, such as the 2.4 GHz band, the 5 GHz band, the 60 GHz band, the 3.6 GHz band, and the 900 MHz band. Some examples of the APs 102 and STAs 104 described herein also may communicate in other frequency bands, such as the 5.9 GHz and the 6 GHz bands, which may support both licensed and unlicensed communications. The APs 102 and STAs 104 also can communicate over other frequency bands such as shared licensed frequency bands, where multiple operators may have a license to operate in the same or overlapping frequency band or bands.

Each of the frequency bands may include multiple sub-bands or frequency channels. For example, PPDUs conforming to the IEEE 802.11n, 802.11ac, 802.11ax and 802.11be standard amendments may be transmitted over the 2.4 GHz, 5 GHz or 6 GHz bands, each of which is divided into multiple 20 MHz channels. As such, these PPDUs are transmitted over a physical channel having a minimum bandwidth of 20 MHz, but larger channels can be formed through channel bonding. For example, PPDUs may be transmitted over physical channels having bandwidths of 40 MHz, 80 MHz, 160 or 320 MHz by bonding together multiple 20 MHz channels.

Each PPDU is a composite structure that includes a PHY preamble and a payload in the form of a PHY service data unit (PSDU). The information provided in the preamble may be used by a receiving device to decode the subsequent data in the PSDU. In instances in which PPDUs are transmitted over a bonded channel, the preamble fields may be duplicated and transmitted in each of the multiple component channels. The PHY preamble may include both a legacy portion (or "legacy preamble") and a non-legacy portion (or "non-legacy preamble"). The legacy preamble may be used for packet detection, automatic gain control and channel estimation, among other uses. The legacy preamble also may generally be used to maintain compatibility with legacy devices. The format of, coding of, and information provided in the non-legacy portion of the preamble is associated with the particular IEEE 802.11 protocol to be used to transmit the payload.

Figure 2:
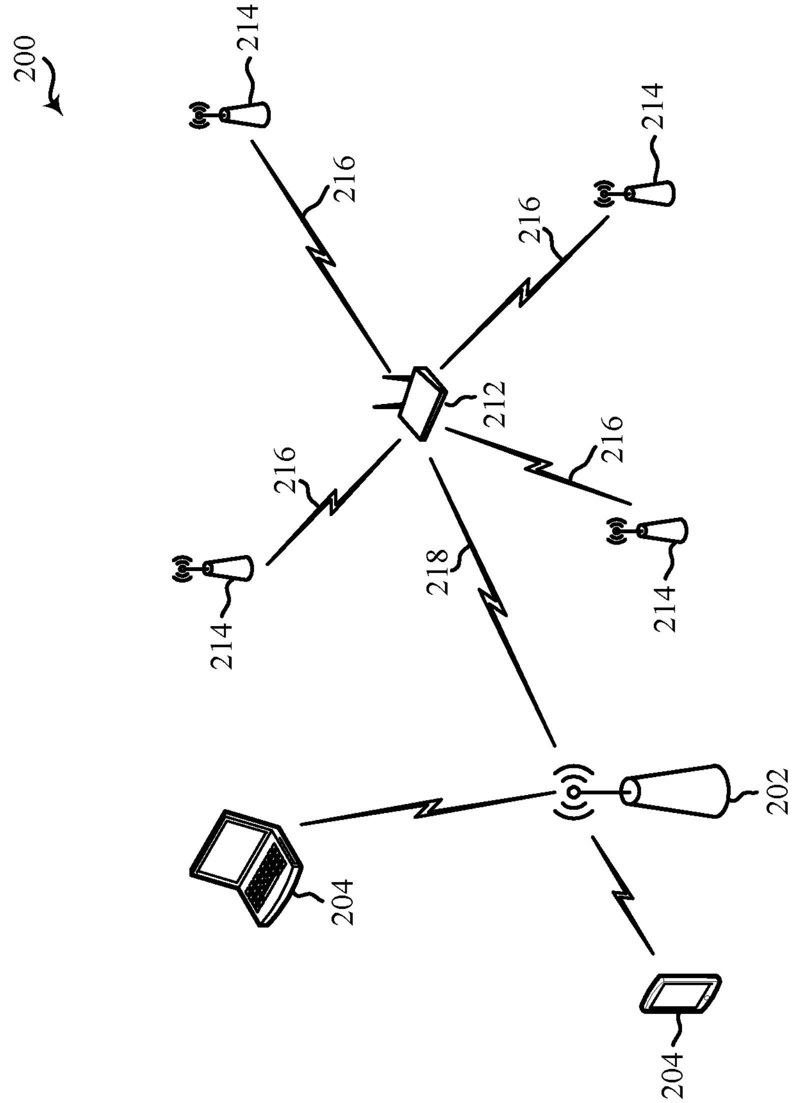
FIG. 2 shows a pictorial diagram of another example wireless communication network.

FIG. 2 shows a pictorial diagram of another example wireless communication network 200. According to some aspects, the wireless communication network 200 can be an example of a mesh network, an IoT network or a sensor network in accordance with one or more of the IEEE 802.11 family of wireless communication protocol standards (including the 802.11ah amendment). The wireless network 200 may include multiple wireless communication devices 214. The wireless communication devices 214 may represent various devices such as display devices (for example, TVs, computer monitors, navigation systems, among others), music or other audio or stereo devices, remote control devices ("remotes"), printers, kitchen or other household appliances, among other examples.

In some examples, the wireless communication devices 214 sense, measure, collect or otherwise obtain and process data and then transmit such raw or processed data to an intermediate device 212 for subsequent processing or distribution. Additionally or alternatively, the intermediate device 212 may transmit control information, digital content (for example, audio or video data), configuration information or other instructions to the wireless communication devices 214. The intermediate device 212 and the wireless communication devices 214 can communicate with one another via wireless communication links 216. In some examples, the wireless communication links 216 include Bluetooth links or other PAN or short-range communication links.

In some examples, the intermediate device 212 also may be configured for wireless communication with other networks such as with a Wi-Fi WLAN or a wireless (for example, cellular) wide area network (WWAN), which may, in turn, provide access to external networks including the Internet. For example, the intermediate device 212 may associate and communicate, over a Wi-Fi link 218, with an AP 202 of a WLAN network, which also may serve various STAs 204. In some examples, the intermediate device 212 is an example of a network gateway, for example, an IoT gateway. In such a manner, the intermediate device 212 may serve as an edge network bridge providing a Wi-Fi core backhaul for the IoT network including the wireless communication devices 214. In some examples, the intermediate device 212 can analyze, preprocess and aggregate data received from the wireless communication devices 214 locally at the edge before transmitting it to other devices or external networks via the Wi-Fi link 218. The intermediate device 212 also can provide additional security for the IoT network and the data it transports.

Aspects of transmissions may vary according to a distance between a transmitter (for example, an AP 102 or a STA 104) and a receiver (for example, another AP 102 or STA 104). Wireless communication devices may generally benefit from having information regarding the location or proximities of the various STAs 104 within the coverage area. In some examples, relevant distances may be determined (for example, calculated or computed) using RTT-based ranging procedures. Additionally, in some examples, APs 102 and STAs 104 may perform ranging operations. Each ranging operation may involve an exchange of fine timing measurement (FTM) frames (such as those defined in the 802.11az amendment to the IEEE family of wireless communication protocol standards) to obtain measurements of RTT transmissions between the wireless communication devices.

Figure 3:
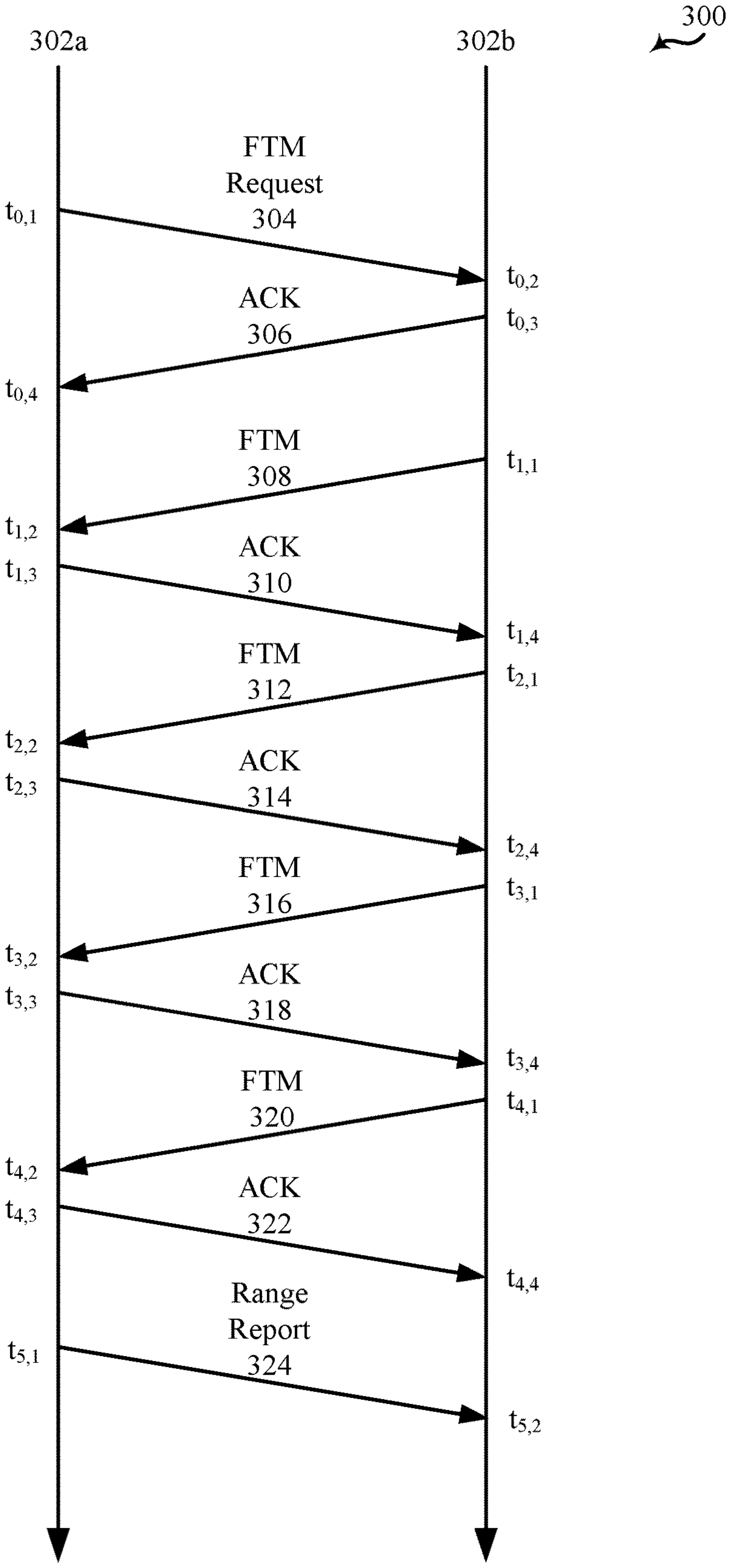
FIG. 3 shows a timing diagram illustrating an example process for performing a ranging operation.

FIG. 3 shows a timing diagram illustrating an example process for performing a ranging operation 300. The process for the ranging operation 300 may be conjunctively performed by two wireless communication devices 302*a* and 302*b* in accordance with the IEEE 802.11REVme standards, which may each be an example of an AP 102 or a STA 104.

The ranging operation 300 begins with the first wireless communication device 302*a* transmitting an initial FTM range request frame 304 at time $t_{0,1}$. Responsive to successfully receiving the FTM range request frame 304 at time $t_{0,2}$, the second wireless communication device 302*b* responds by transmitting a first ACK 306 at time $t_{0,3}$, which the first wireless communication device 302*a* receives at time $t_{0,4}$. The first wireless communication device 302*a* and the second wireless communication device 302*b* then exchange one or more FTM bursts, which may each include multiple exchanges of FTM action frames (hereinafter simply "FTM frames") and corresponding ACKs. One or more of the FTM request frame 304 and the FTM action frames (hereinafter simply "FTM frames") may include FTM parameters specifying various characteristics of the ranging operation 300.

In the example shown in FIG. 3, in a first exchange, beginning at time $t_{1,1}$, the second wireless communication device 302*b* transmits a first FTM frame 308. The second wireless communication device 302*b* records the time $t_{1,1}$ as the time of departure (TOD) of the first FTM frame 308. The first wireless communication device 302*a* receives the first FTM frame 308 at time $t_{1,2}$ and transmits a first acknowledgement frame (ACK) 310 to the second wireless communication device 302*b* at time $t_{1,3}$. The first wireless communication device 302*a* records the time $t_{1,2}$ as the time of arrival (TOA) of the first FTM frame 308, and the time $t_{1,3}$ as the TOD of the first ACK 310. The second wireless communication device 302*b* receives the first ACK 310 at time $t_{1,4}$ and records the time $t_{1,4}$ as the TOA of the first ACK 310.

Similarly, in a second exchange, beginning at time $t_{2,1}$, the second wireless communication device 302*b* transmits a second FTM frame 312. The second FTM frame 312 includes a first field indicating the TOD of the first FTM frame 308 and a second field indicating the TOA of the first ACK 310. The first wireless communication device 302*a* receives the second FTM frame 312 at time $t_{2,2}$ and transmits a second ACK 314 to the second wireless communication device 302*b* at time $t_{2,3}$. The second wireless communication device 302*b* receives the second ACK 314 at time $t_{2,4}$. Similarly, in a third exchange, beginning at time $t_{3,1}$, the second wireless communication device 302*b* transmits a third FTM frame 316. The third FTM frame 316 includes a first field indicating the TOD of the second FTM frame 312 and a second field indicating the TOA of the second ACK 314. The first wireless communication device 302*a* receives the third FTM frame 316 at time $t_{3,2}$ and transmits a third ACK 318 to the second wireless communication device 302*b* at time $t_{3,3}$. The second wireless communication device 302*b* receives the third ACK 318 at time $t_{3,4}$. Similarly, in a fourth exchange, beginning at time $t_{4,1}$, the second wireless communication device 302*b* transmits a fourth FTM frame 320. The fourth FTM frame 320 includes a first field indicating the TOD of the third FTM frame 316 and a second field indicating the TOA of the third ACK 318. The first wireless communication device 302*a* receives the fourth FTM frame 320 at time $t_{4,2}$ and transmits a fourth ACK 322 to the second wireless communication device 302*b* at time $t_{4,3}$. The second wireless communication device 302*b* receives the fourth ACK 322 at time $t_{4,4}$.

The first wireless communication device 302*a* determines (for example, obtains, identifies, ascertains, calculates, or computes) a range indication in accordance with the TODs and TOAs. For example, in implementations or instances in which an FTM burst includes four exchanges of FTM frames, the first wireless communication device 302*a* may determine (for example, obtain, identify, ascertain, calculate, or compute) a round trip time (RTT) between itself and the second wireless communication device 302*b* in accordance with Equation 1.

$$RTT = \frac{1}{3}\left(\sum_{k=1}^{3} t_{4,k} - \sum_{k=1}^{3} t_{1,k}\right) - \left(\sum_{k=1}^{3} t_{3,k} - \sum_{k=1}^{3} t_{2,k}\right) \quad (1)$$

In some implementations, the range indication is the RTT. Additionally or alternatively, in some implementations, the first wireless communication device 302*a* may determine (for example, obtain, identify, ascertain, calculate, or compute) an actual approximate distance between itself and the second wireless communication device 302*b*, for example, by multiplying the RTT by an approximate speed of light in the wireless medium. In such instances, the range indication may additionally or alternatively include the distance value. Additionally or alternatively, the range indication may include an indication as to whether the second wireless communication device 302*b* is within a proximity (for example, a service discovery threshold) of the first wireless communication device 302*a* in accordance with the RTT. In some implementations, the first wireless communication device 302*a* may then transmit the range indication to the second wireless communication device 302*b*, for example, in a range report 324 at time $t_{5,1}$, which the second wireless communication device receives at time $t_{5,2}$.

EXAMPLE TECHNIQUES TO PROTECT WIRELESS ACCESS POINT (AP) FROM REPEATED ATTACKS

A wireless access point (AP) is associated with a wireless network. A service set identifier (SSID), which is a name of the wireless network associated with a wireless AP, is generally detectable to any wireless station (STA) located within a communicable distance of the wireless AP. For example, although the SSID can be configured to be hidden, owners of the wireless AP may not hide the SSID to facilitate discovery and connection. As a result, there is a security risk that the attacker may try to connect or break into the wireless network without notice. For example, the attacker within the communicable distance of the wireless AP may use a wireless STA to connect to the wireless AP by submitting various guesses of security credential inputs (such as a password or passphrase).

In some cases, the attacker may be able to make multiple brute force attempts to connect to the wireless AP without being detected in real-time by an administrator or owner of the wireless AP. For example, the attacker may execute a first set of steps to connect to the wireless AP. In the first of these steps, the attacker may turn on Wi-Fi of a wireless STA being used by the attacker as an attack device. In a second step, the attacker may determine or obtain a list of available wireless networks within a nearby area of the wireless STA. In a third step, the attacker may try to connect to the wireless AP associated with one of the available wireless networks (by guessing the security credential input for the SSID of interest in the area of the wireless STA). In a fourth step, the attacker may try multiple security credential input guesses manually or in an automated way, to try to get to a correct security credential input associated with the SSID of interest.

In the scenario described above, the attacker may be able to attack the wireless AP repeatedly (by continually guessing and submitting multiple incorrect security credential inputs) without any detection from the administrator of the wireless AP. This may be possible if the wireless AP does not alert the administrator of the wireless AP of the continual incorrect security credential inputs being received from the wireless STA.

In some cases, the attacker may change location while attacking the wireless AP to avoid detection. For example, at each attempt of the attack (that is, submission of an incorrect security credential input), the attacker may change a media access control (MAC) address of the wireless STA being used to run the attack. This may make the detection of the attacker difficult for the administrator of the wireless AP.

In some cases, the attacker may execute a second set of steps to connect to the wireless AP. For example, in a first of these steps, the attacker may turn on Wi-Fi on the wireless STA being used to connect to the wireless AP. In a second step, the attacker may assign a new MAC address to the wireless STA. In a third step, the attacker may determine or obtain a list of available wireless networks within a nearby area of the wireless STA. In a fourth step, the attacker may try to connect to the wireless AP associated with one of the available wireless networks (by breaking or guessing the security credential input for the SSID of interest in the area of the wireless STA). In a fifth step, the attacker may again guess the security credential input for the SSID of interest when unable to connect to the wireless AP. In a sixth step, when the guess of the security credential input is incorrect and the wireless STA has not been able to connect to the wireless AP, the attacker may return to the second step (that is, replace the current MAC address of the wireless STA with another new MAC address). In such a sophisticated attack process, the attacker may change the current MAC address of the wireless STA to a new MAC address every time before guessing and submitting the security credential input for the SSID, and thereby appearing to the wireless AP as a new wireless STA on each attack.

To protect the wireless AP from repeated brute force attacks, techniques described herein may notify the administrator of the wireless AP of the break-in attempt by the wireless STA to connect to the wireless AP and/or may temporarily block the wireless STA to try to stop or prevent the attack. For example, a combination of techniques may be implemented to block the wireless STA from submitting a limitless number of incorrect security credential inputs in trying to connect to the wireless AP. These techniques may include using embargo lists to block the wireless STA MAC address after N number of consecutive unsuccessful attempts to connect to the wireless AP, using telescopic delays to make it progressively harder for the wireless STA to attack at regular short intervals, and/or determining a position of the wireless STA of the attacker and then blocking attacks from wireless STAs at the determined location.

Particular aspects of the subject matter described in this disclosure can be implemented to realize one or more of the following potential advantages. In some examples, by the wireless AP, the described techniques can be used to at least temporarily block attempts to submit the incorrect security credential inputs on the wireless STA by the attacker, which may conserve processing resources of the wireless AP that would otherwise be consumed as a result of additional attempts and/or which may help to secure the wireless AP. Additionally, or alternatively, in some examples, some techniques described herein may alert the administrator of the wireless AP of these repeated brute force attacks so that the administrator of the wireless AP is able to take a corrective action, which may help to secure the wireless AP. In some examples, the techniques described herein may provide for faster or more accurate detection of attacks, which may help to secure the wireless AP and/or reduce consumption of processing resources of the wireless AP relative to a prolonged attack.

Some aspects of the subject matter described in this disclosure may be further understood with reference to FIGS. 4-9.

Figure 4:
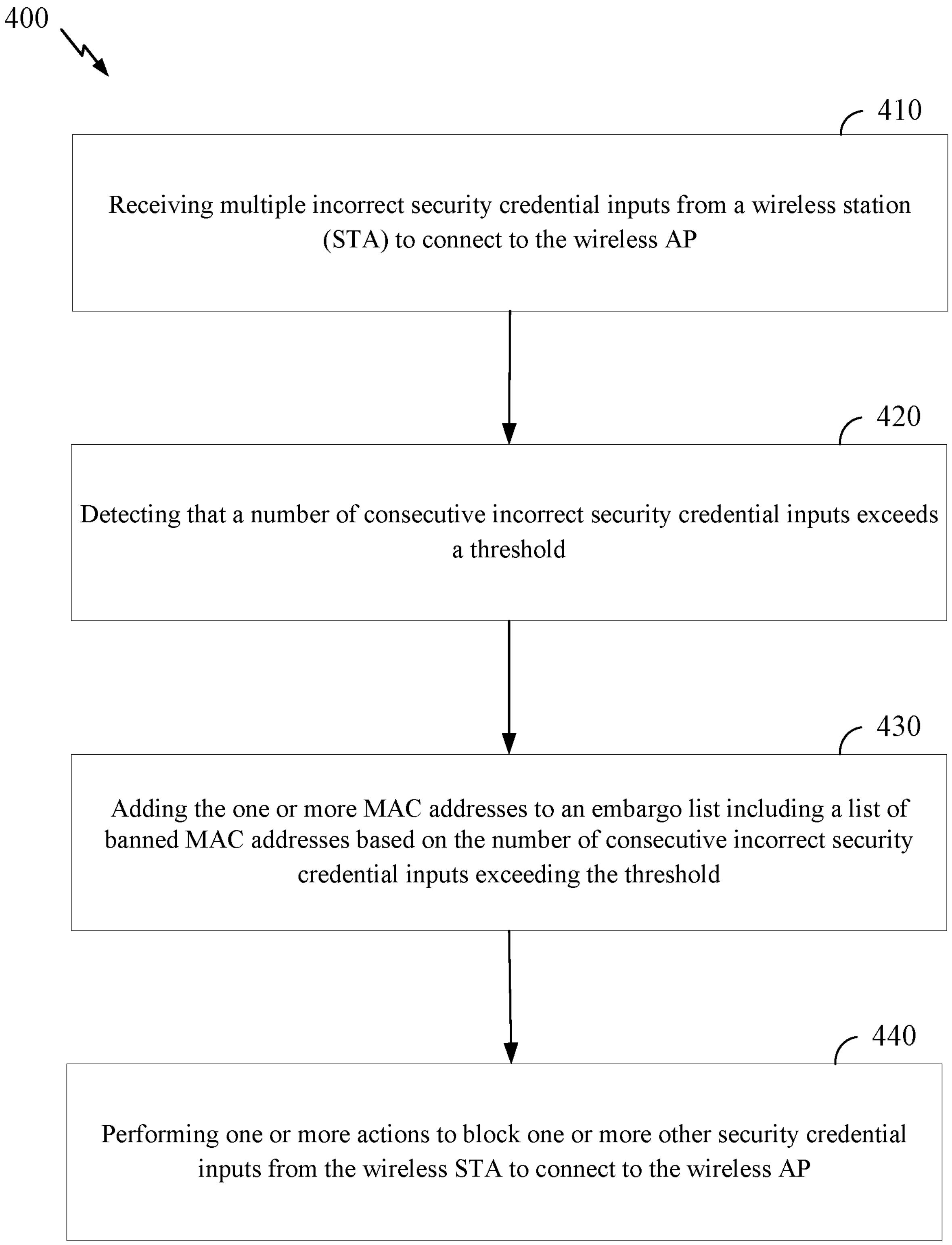
FIG. 4 shows a flowchart illustrating an example process performable by a wireless access point (AP) that supports protecting the wireless AP from repeated attacks.

FIG. 4 shows a flowchart illustrating a process 400 performable at a wireless AP that supports protecting the wireless AP from repeated attacks, according to some aspects of the present disclosure. The operations of the process 400 may be implemented by the wireless AP or its components as described herein. For example, the process 400 may be performed by a wireless communication device, such as the wireless communication device 900 described with reference to FIG. 9, operating as or within the wireless AP. In some examples, the process 400 may be performed by the wireless AP, such as one of the wireless APs 102 described with reference to FIG. 1.

At 410, the process 400 may include the wireless AP receiving multiple incorrect security credential inputs from a wireless STA to connect to the wireless AP. The multiple incorrect security credential inputs may be associated with one or more MAC addresses of the wireless STA.

In one example, an attacker may use the wireless STA associated with a fixed MAC address (e.g., as a first MAC address) to send all the incorrect security credential inputs to the wireless AP. In this example, the wireless AP may, at 410, receive the multiple incorrect security credential inputs from one MAC address.

In another example, the attacker may change a MAC address of the wireless STA each time before sending a new incorrect security credential input to the wireless AP. For example, the attacker may initially use the wireless STA associated with the first MAC address to send a first incorrect security credential input to the wireless AP. The attacker may then replace the first MAC address with a second MAC address, and use the wireless STA associated with the second MAC address to send a second incorrect security credential input to the wireless AP. In this example, the wireless AP may, at 410, receive the multiple incorrect security credential inputs from multiple MAC addresses even though the wireless AP may receive the multiple incorrect security credential inputs from the same wireless STA.

At 420, the process 400 may include the wireless AP detecting that a number of consecutive incorrect security credential inputs exceeds a threshold. For example, the wireless AP may, e.g., iterate a counter or add an entry to a list each time an incorrect security credential input follows a prior incorrect security credential input, and the wireless AP may record information (e.g., a MAC address) associated with each incorrect security credential input. Continuing with the previous example, the wireless AP may detect that the number of consecutive incorrect security credential inputs exceeds the threshold based on that information.

In one aspect, an administrator of the wireless AP may configure the threshold (such as N=3, N=4, N=100, etc.). In another aspect, the threshold may have a fixed value, such as a value that cannot be changed by the administrator of the wireless AP.

In one aspect, the wireless AP may detect that N+1 consecutive incorrect security credential inputs have been received from the wireless STA, which is associated with the first MAC address. For example, the threshold may be configured such that the wireless AP can detect that the number of consecutive incorrect security credential inputs from one MAC address has exceeded the threshold.

In another aspect, the wireless AP may detect that N+1 consecutive incorrect security credential inputs have been received from a single wireless STA associated with different MAC addresses. For example, the wireless AP may detect a first incorrect security credential input associated with a first MAC address of the wireless STA, a second incorrect security credential input associated with a second MAC address of the wireless STA, a third incorrect security credential input associated with a third MAC address of the wireless STA, and a fourth incorrect security credential input associated with a fourth MAC address of the wireless STA. Continuing with the previous example, the wireless AP may detect that the four incorrect security credential inputs exceed the threshold. In this way, the threshold may be configured such that the wireless AP can detect that the number of consecutive incorrect security credential inputs from multiple MAC addresses has exceeded the threshold.

At 430, the process 400 may include the wireless AP adding the one or more MAC addresses to an embargo list including a list of banned MAC addresses based on the number of consecutive incorrect security credential inputs exceeding the threshold. For example, on the fourth unsuccessful security credential input attempt (when N=3), the MAC addresses associated with the wireless STA up to the fourth MAC address may be added to the embargo list.

At 440, the process 400 may include the wireless AP performing one or more actions to block one or more other security credential inputs from the wireless STA to connect to the wireless AP. For example, the wireless AP may perform the one or more actions after, or in connection with, adding the one or more MAC addresses to the embargo list.

In certain aspects, the one or more actions may include disabling an input field on (or associated with) the wireless STA to prevent further entry of the one or more other security credential inputs to connect to the wireless AP. For example, when the attacker using the wireless STA exceeds N consecutive incorrect security credential inputs, the wireless AP may add the one or more MAC addresses associated with the wireless STA to the embargo list, so that any further attempts by the attacker to use these specific MAC addresses to connect to the wireless AP, no security credential input field is presented on a display of the wireless STA.

In certain aspects, the one or more actions may include generating an alert tone based on the number of consecutive incorrect security credential inputs exceeding the threshold. For example, when the number of consecutive incorrect security credential inputs exceeds the threshold, the wireless AP may output, via a speaker of the wireless AP or a computing device that an administrator uses to manage the wireless AP, some emergency alert tone on the Nth break-in attempt and/or for subsequent break-in attempts by the attacker (e.g., for each subsequent break-in attempt, for each Mth subsequent break-in attempt where M is greater than 1, etc.).

In certain aspects, the one or more actions may include transmitting an alert message to a wireless device of an administrator of the wireless AP based on the number of consecutive incorrect security credential inputs exceeding the threshold. The alert message may include data associated with the number of consecutive incorrect security credential inputs. For example, when the number of consecutive incorrect security credential inputs exceeds the threshold, the wireless AP may send a push notification (indicating the number of consecutive incorrect security credential inputs, the MAC addresses associated with the inputs, etc.) to a web application (such as an email account, a web-based dashboard, etc.) or a computing device of the administrator.

The process 400 described above may include one or more of the following aspects. In certain aspects, the wireless AP may receive a first incorrect security credential input of the multiple incorrect security credential inputs from the wireless STA and the wireless AP may add a telescopic delay multiplier after receiving each incorrect security credential input from the wireless STA. For example, after receiving the first incorrect security credential input, the wireless AP may add a first delay time period preventing entry of another security credential input into the wireless STA or preventing receipt of another security credential input from the wireless STA.

In some aspects, the wireless AP may receive a second incorrect security credential input of the multiple incorrect security credential inputs from the wireless STA after the first delay time period. After receiving the second incorrect security credential input, the wireless AP may add a second delay time period preventing entry of another security credential input into the wireless STA or preventing receipt of another security credential input from the wireless STA. The second delay time period (such as 1 minute or any other amount of time) may have a non-zero value and may be a higher value than the first delay time period (such as 0 or any other amount of time). The higher value may correspond to a longer amount of time.

In some aspects, the wireless AP may receive a third incorrect security credential input of the multiple incorrect security credential inputs from the wireless STA after the second delay time period. After receiving the third incorrect security credential input, the wireless AP may add a third delay time period preventing entry of another security credential input into the wireless STA or preventing receipt of another security credential input from the wireless STA. A value of the third delay time period (such as 3 minutes or any other amount of time) may be a higher value than a value of the second delay time period.

The wireless AP may receive a fourth incorrect security credential input of the multiple incorrect security credential inputs from the wireless STA after the second delay time period. After receiving the fourth incorrect security credential input, the wireless AP may add a fourth delay time period preventing entry of another security credential input into the wireless STA. A value of the fourth delay time period (such as 10 minutes or any other amount of time) may be higher than a value of the third delay time period.

In certain aspects, the wireless AP may determine a location of the wireless STA. In one aspect, the wireless AP may determine a location of the wireless STA using a round trip time (RTT) measurement, based on information associated with one or more of the multiple incorrect security credential inputs received from the wireless STA. In another aspect, the wireless AP may determine a location of the wireless STA using an angle of arrival (AoA) measurement, based on information associated with one or more of the multiple incorrect security credential inputs received from the wireless STA.

In certain aspects, the wireless AP may block one or more subsequent security credential inputs received from each wireless STA located at (or near) the determined location of the wireless STA to prevent possible wireless connection to the wireless AP, based on the number of consecutive incorrect security credential inputs exceeding the threshold. For example, when many incorrect security credential inputs are determined to be arriving from a first location, the wireless STAs security credential inputs from the first location are blocked.

In certain aspects, the wireless AP may add the one or more MAC addresses and the determined location of the wireless STA to the embargo list, based on the number of consecutive incorrect security credential inputs exceeding the threshold.

Figure 5A:
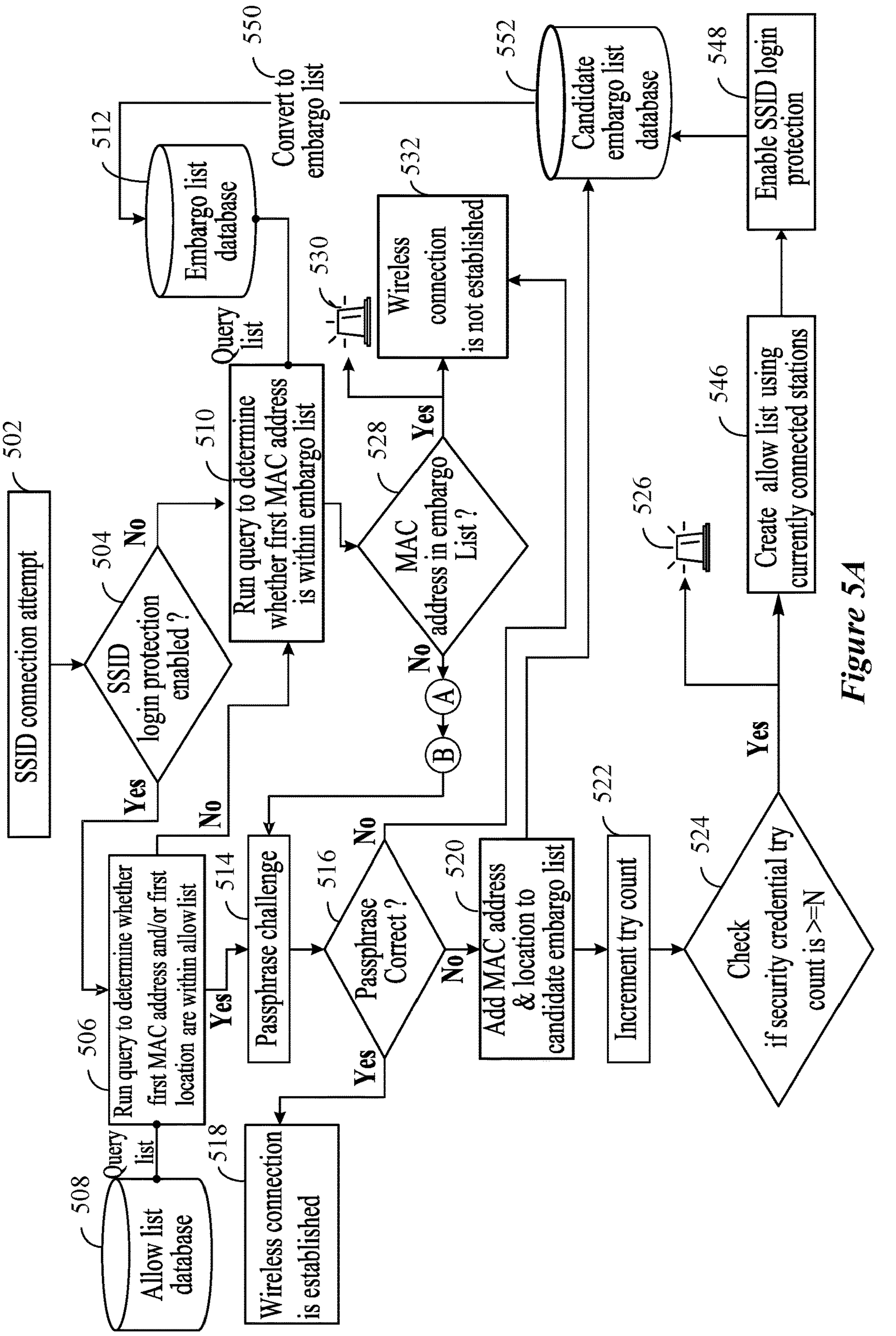
FIGS. 5A-5C show another flowchart illustrating an example process performable by a wireless AP that supports protecting the wireless AP from repeated attacks.
Figure 5B:
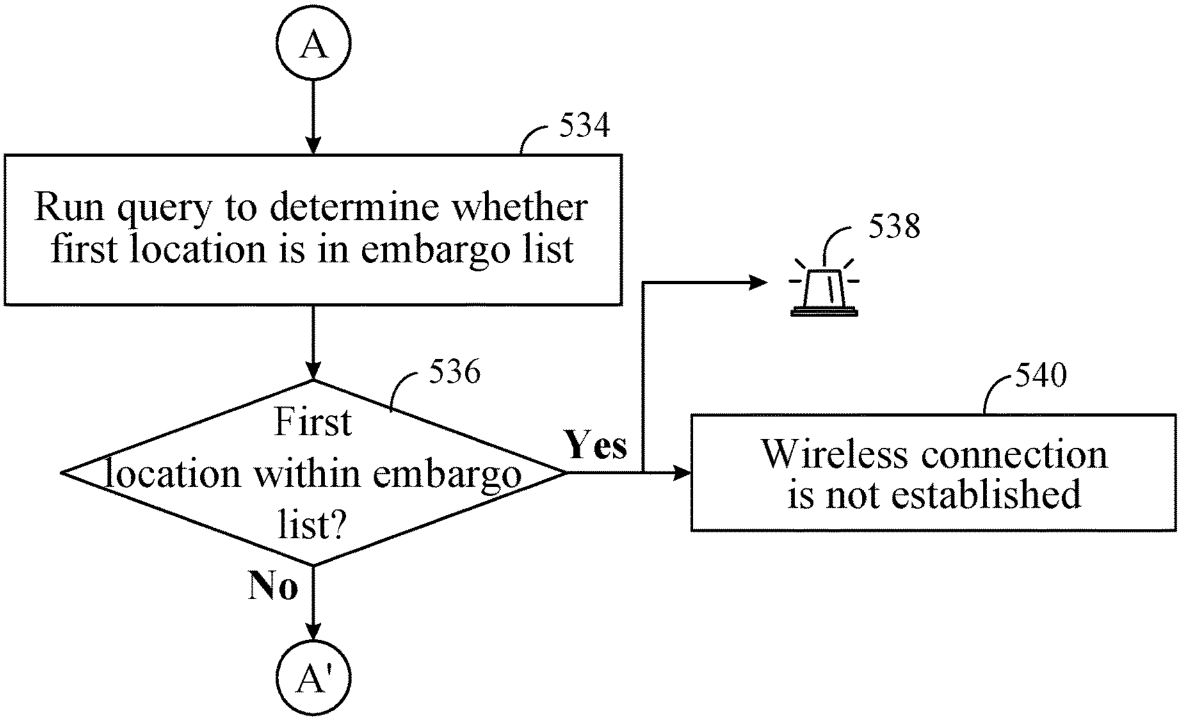
Figure 5C:
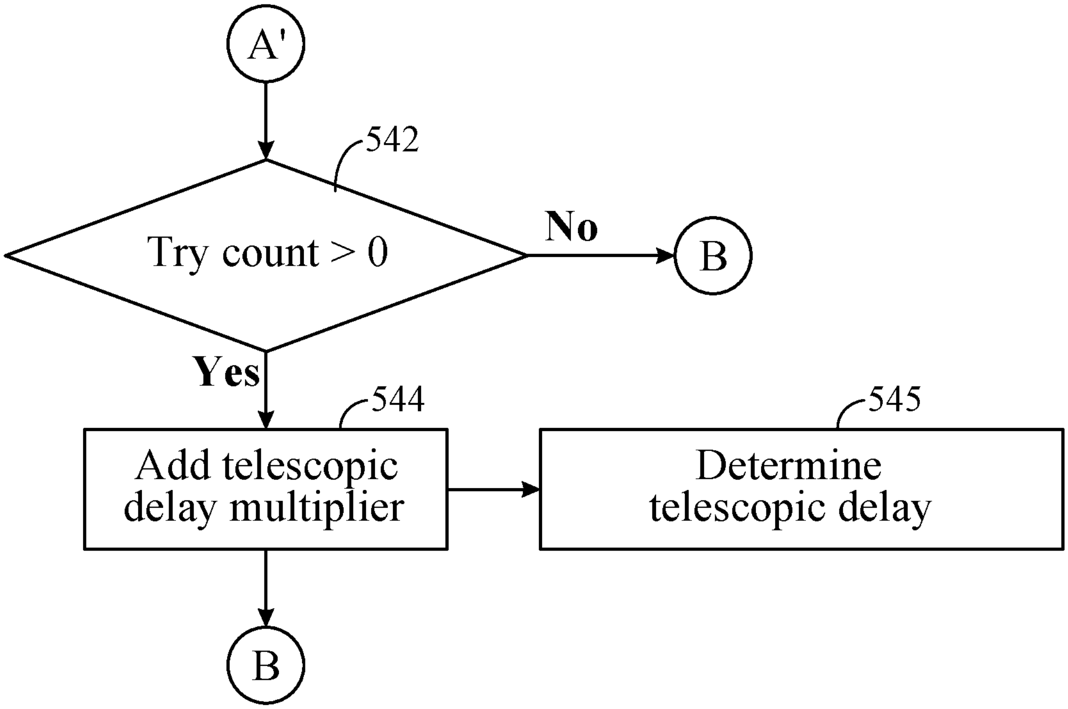

FIGS. 5A-5C illustrate an example process 500 performable by a wireless AP that supports protecting the wireless AP from repeated attacks. As illustrated in FIG. 5A, at 502, a wireless STA (associated with a first MAC address) may send a first connection request to a wireless AP in order to try to connect to the wireless AP (e.g., the wireless STA may perform a wireless AP SSID connection attempt). The first connection request may include a security credential input and may include, or be associated with, a MAC address of the wireless STA. The wireless AP (e.g., using a recognized attack MAC ID detection module 612 illustrated in FIG. 6) may determine the first MAC address based on the processing of the first connection request.

At 504, the wireless AP may determine whether SSID login protection is enabled at the wireless AP to protect the wireless AP, in response to the first connection request. For example, the wireless AP may determine that the SSID login protection is enabled at the wireless AP when a network security application or mode is activated at the wireless AP.

Figure 7:
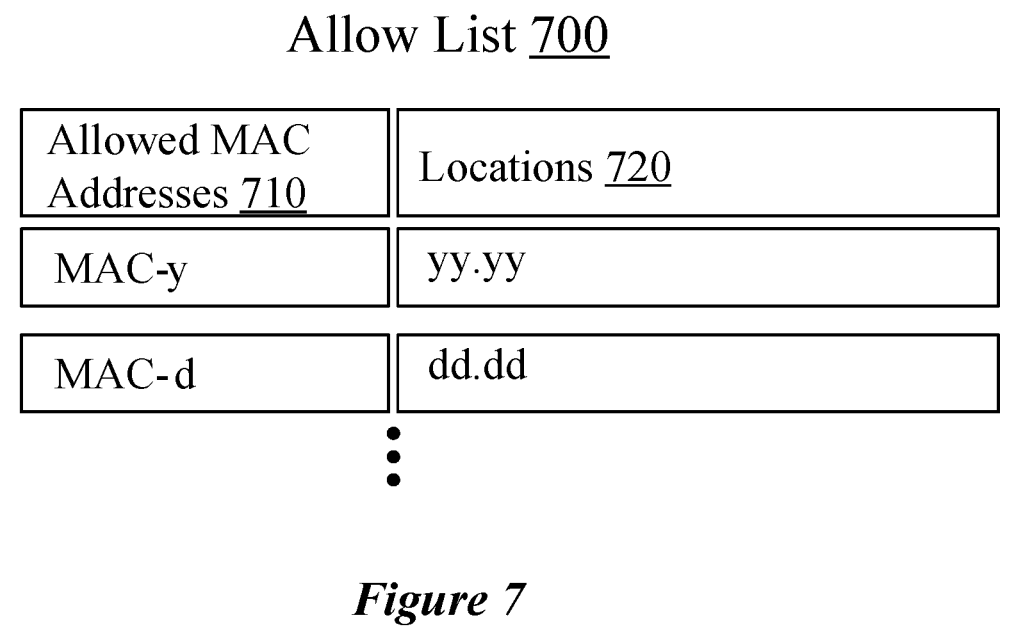

In one aspect, if the wireless AP determines that the SSID login protection is enabled at the wireless AP (504—YES), then at 506, the wireless AP may run or execute a query to determine whether the first MAC address and/or a first location of the wireless STA are within an allow list. The allow list may be stored in an allow list database 508 and the allow list may include a list of MAC addresses and corresponding locations that are allowed to connect to the wireless AP. FIG. 7, described in more detail below, shows an example allow list 700 including a list of allowed MAC addresses 710 of wireless STAs and corresponding locations 720 of the wireless STAs.

Figure 6:
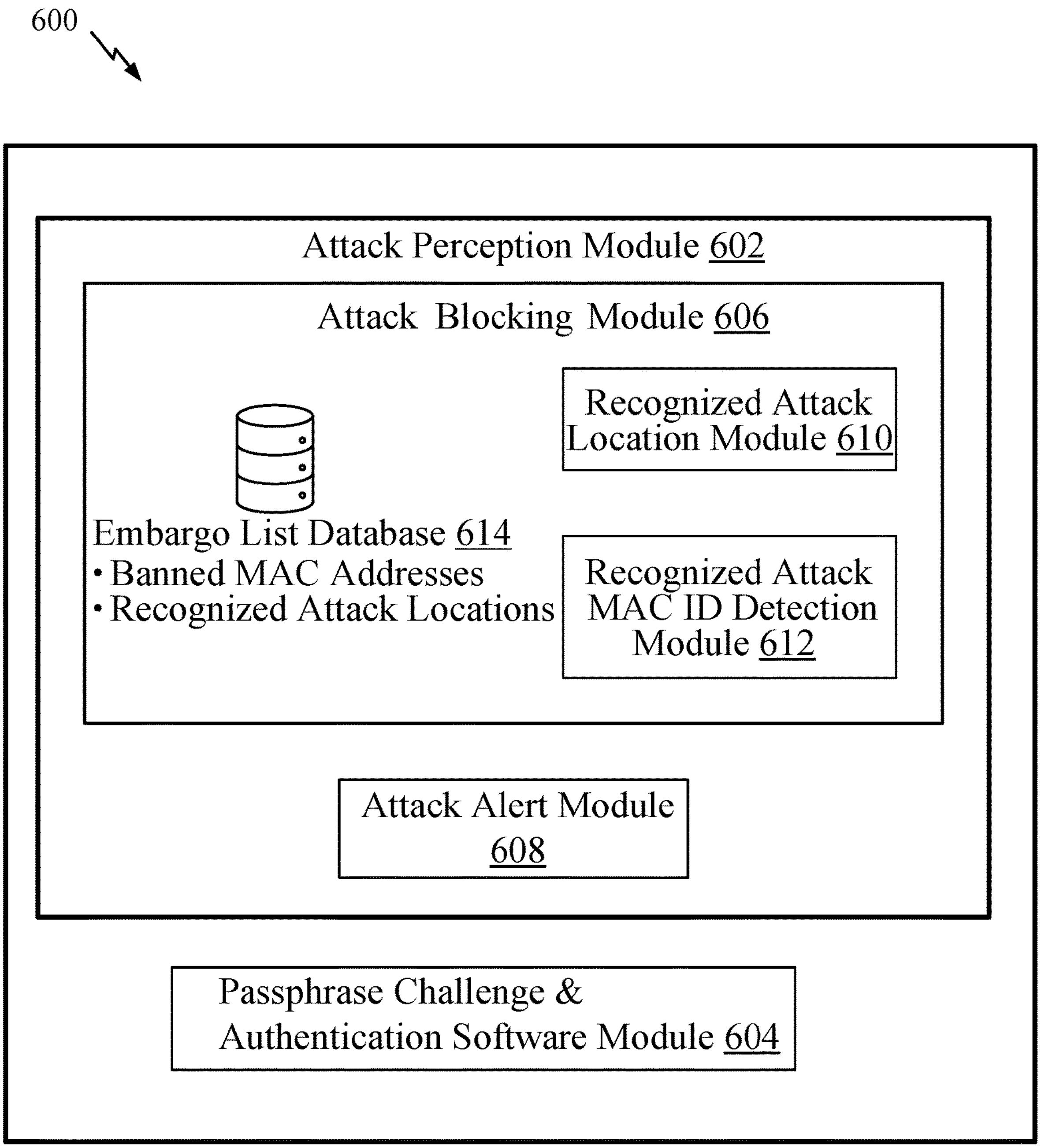
FIG. 6 shows a block diagram illustrating different modules and databases associated with a wireless AP.

In some examples, the wireless AP (e.g., via a recognized attack location module 610 illustrated in FIG. 6) may determine the first location (e.g., the current location) of the wireless STA, using an RTT measurement and/or an AoA measurement, based on the processing of the first connection request, prior to running or executing the query (at 506). The RTT measurement and/or the AoA measurement may be performed as described with reference to FIG. 3.

If the wireless AP determines that the SSID login protection is not enabled at the wireless AP (504—NO), at 510, the wireless AP may run or execute a query to determine whether the first MAC address is within an embargo list. The embargo list may be stored in an embargo list database 512 (which is also illustrated in FIG. 6) and may include a list of banned MAC addresses and corresponding locations (such as recognized attack locations) that are not allowed to connect to the wireless AP. FIG. 8, described in more detail below, shows an embargo list 800 including a list of banned MAC addresses 810 of wireless STAs and recognized attack locations 820 of wireless STAs.

In some examples, the wireless AP may determine the first location (e.g., the current location) of the wireless STA, using an RTT measurement and/or an AoA measurement, based on the processing of the first connection request, prior to running or executing the query (at 510).

When the wireless AP determines that the first MAC address and the first location are within the allow list (506—YES), at 514, the wireless AP (e.g., via a passphrase challenge and authentication software module illustrated in FIG. 6) may present (or may cause presentation of) an input field (e.g., a passphrase challenge) on a display of the wireless STA for entry of a first security credential input to connect to the wireless AP. The wireless AP may then receive the first security credential input from the wireless STA to connect to the wireless AP.

However, in some cases, when the wireless AP determines that the first MAC address and the first location are not within the allow list (506—NO), the wireless AP may then determine, at 510, whether the first MAC address (and/or the first location) are within the embargo list.

At 516, the wireless AP may determine whether the first security credential input received from the wireless STA is correct. For example, the wireless AP may determine whether a received passphrase corresponding to the first security credential input is correct or not. The wireless AP may query the embargo list database 512 to determine whether the first security credential input is correct.

In one aspect, the wireless AP may determine that the first security credential input received from the wireless STA is correct (516—YES), then at 518, the wireless AP may connect with the wireless STA (e.g., a wireless internet protocol (IP) connection may be established between the wireless AP and the wireless STA).

In another aspect, if the wireless AP determines that the first security credential input received from the wireless STA is not correct (516—NO), then the wireless AP may not connect with the wireless STA (e.g., at 532, the wireless IP connection is not established between the wireless AP and the wireless STA). Also, at 520 (516—NO), the wireless AP may add the first MAC address and the first location of the wireless STA to a candidate embargo list. For example, the candidate embargo list may identify wireless STAs that that are potentially attackers, but that the wireless AP has not yet determined to block from connecting to the wireless AP. The candidate embargo list may be stored in a candidate embargo list database 552.

At 522, the wireless AP may increment a security credential input try count (e.g., to indicate that an initial or subsequent incorrect security credential input has been received from the wireless STA).

At 524, the wireless AP may check whether the security credential input try count is greater than or equal to N (e.g., N indicates a preconfigured number of attempts allowed to submit the security credential inputs to connect to the wireless AP).

If the wireless AP determines that the security credential input try count is greater than or equal to N (524—YES), then at 526, the wireless AP (e.g., via an attack alert module illustrated in FIG. 6) may transmit an alert message to a device of an administrator of the wireless AP. The alert message may include data associated with the number of consecutive incorrect security credential inputs. For example, the wireless AP may send a push notification (e.g., indicating the number of consecutive incorrect security credential inputs, the MAC addresses associated with the inputs, etc.) to a web application (such as an email account, a web-based dashboard, etc.) or a computing device of an administrator of the wireless AP.

Referring back to 510 where the wireless AP may run or execute the query to determine whether the first MAC address is within the embargo list, after the query is executed, then at 528, the wireless AP may process the embargo list to determine whether the first MAC address (and/or the first location) is within the embargo list.

In one aspect, when the wireless AP determines that the first MAC address is in the embargo list (528—YES), then at 530, the wireless AP may transmit the alert message to the wireless device of the administrator of the wireless AP (e.g., in a manner similar to that described at 526). As noted above, the alert message may at least indicate the break-in attempt by the attacker from the wireless STA. In addition, at 532, the wireless AP may decline to establish the wireless connection with the wireless STA. That is, the wireless connection between the wireless STA and the wireless AP may not be established.

In another aspect, when the wireless AP may determine that the first MAC address is not in the embargo list (528—NO), then as illustrated in FIG. 5B, at 534, the wireless AP may execute or run a query to determine whether the first location of the wireless STA is in the embargo list. For example, the wireless AP may use the first location as a parameter in a query to the embargo list.

At 536, the wireless AP may process the embargo list to determine whether the first location is within the embargo list based on the query.

In one aspect, when the wireless AP determines that the first location is within the embargo list (536—YES), then at 538, the wireless AP may transmit the alert message to the wireless device of the administrator of the wireless AP (e.g., in a manner similar to that described at 526). As noted above, the alert message may at least indicate the break-in attempt by the attacker using the wireless STA. In addition, at 540, the wireless AP may decline to establish the wireless connection with the wireless STA. That is, the wireless connection between the wireless STA and the wireless AP may not be established.

In another aspect, when the wireless AP determines that the first location is not within the embargo list (536—NO), then as illustrated in FIG. 5C, at 542, the wireless AP may determine whether the security credential input try count is greater than zero.

In one aspect, when the wireless AP determines that the security credential input try count is greater than zero (542—YES), then at 544, the wireless AP may add a telescopic delay multiplier to subsequent security credential input tries. A telescopic delay multiplier may include a delay time period before a user of the wireless STA is permitted to enter another security credential input in an input field on a display of the wireless STA or a delay time period before the wireless AP will accept or process another security credential input from the wireless STA. In connection with adding the telescopic delay multiplier, the wireless AP may determine, at 545, a value of the delay time period based on a number of incorrect security credential inputs received from the wireless STA. Once the telescopic delay is added, the wireless AP (at 514 as illustrated in FIG. 5A) may present, after the delay time period, the input field for a passphrase challenge on the display of the wireless STA for entry of a new security credential input to connect to the wireless AP.

Returning to FIG. 5A, if the wireless AP determines that the security credential input try count is greater than or equal to N (524—YES), then, at 546, the wireless AP may create an allow list using information (such as MAC address, locations) associated with wireless STAs currently connected to the wireless AP, and may also enable (at 548) SSID login protection at the wireless AP (e.g., when the SSID login protection is not enabled, as determined at 504). For example, the wireless AP may activate a network security application or mode at the wireless AP to enable the SSID login protection at the wireless AP.

In certain aspects, if the wireless AP determines that the security credential input try count is greater than or equal to N (524—YES), then at 550, the wireless AP may convert information within the candidate embargo list stored in the candidate embargo list database 552 to the embargo list stored in the embargo list database 512. For example, the wireless STAs that the wireless AP has identified as potentially being attackers may be blocked from connecting to the wireless AP by moving information for the wireless STAs from the candidate embargo list database 552 to the embargo list database 512.

FIG. 6 shows a block diagram 600 illustrating different modules and databases associated with a wireless AP. Each module may communicate with other modules, and may include or can be coupled with a processor which may be further coupled with a memory.

The different modules may include an attack perception module 602, and a passphrase challenge and authentication software module 604. The attack perception module 602 may include or can be coupled with different sub-modules such as an attack blocking module 606 and an attack alert module 608. The attack blocking module 606 may include or can be coupled with different sub-modules. The different sub-modules of the attack blocking module 606 may include or can be coupled with a recognized attack location module 610 and a recognized attack MAC ID detection module 612. The attack blocking module 606 may also include or be associated with an embargo list database 614.

The recognized attack MAC ID detection module 612 may be executed to determine a MAC address of a wireless STA, based on processing of information (such as a connection request) received from the wireless STA. In some examples, the recognized attack MAC ID detection module 612 may also be executed to process an embargo list within the embargo list database 614 to check if a MAC address of the wireless STA is in the embargo list.

The recognized attack location module 610 may be executed to determine a current location of the wireless STA, based on processing of information (such as a connection request) received from the wireless STA. In one example, the recognized attack location module 610 may use an RTT measurement process to determine the current location of the wireless STA (e.g., the wireless AP may measure a RTT of communications with the wireless STA to determine a distance of the wireless STA from the wireless AP). In another example, the recognized attack location module may use an AoA measurement process to determine the current location of the wireless STA (e.g., the wireless AP may measure an AoA of a signal from the wireless STA to determine a position of the wireless STA in relation to an antenna of the wireless AP). In some examples, the recognized attack location module 610 may also be executed to process the embargo list within the embargo list database 614 to check if the determined current location of the wireless STA is in the embargo list.

The passphrase challenge and authentication software module 604 may be executed to present an input field (such as a passphrase challenge) on a display of the wireless STA for entry of a security credential input to connect to the wireless AP. Additionally, or alternatively, when the security credential input is received from the wireless STA, the passphrase challenge and authentication software module 604 may be further executed to determine whether the security credential input is correct.

The attack alert module 608 may be executed to transmit an alert message to a wireless device of an administrator of the wireless AP when a number of consecutive incorrect security credential inputs exceeds a threshold. The alert message may include data associated with the number of consecutive incorrect security credential inputs. For example, when the number of consecutive incorrect security credential inputs exceeds the threshold, the attack alert module may be executed to send a push notification (indicating the number of consecutive incorrect security credential inputs, the MAC addresses associated with the inputs, etc.) to a web application (such as an email account, a web-based dashboard, etc.) or a computing device of the administrator.

The embargo list database 614 may include the embargo list. The embargo list may include a list of MAC addresses of wireless STAs that are banned and recognized attack locations.

FIG. 7 shows an allow list 700. A wireless AP may create the allow list 700. The allow list 700 may include a list of allowed MAC addresses 710 of wireless STAs (e.g., MAC-y and MAC-d.) and corresponding locations 720 of wireless STAs (e.g., yy.yy and dd.dd) that are allowed to connect to the wireless AP. The wireless AP may store the allow list in an allow list database. The wireless AP may update the allow list to add information associated with new wireless STAs that may be allowed to connect to the wireless AP and/or remove, from the allow list, information associated with the wireless STAs that may no longer be allowed to connect to the wireless AP.

FIG. 8 shows an embargo list 800. A wireless AP may create the embargo list 800. The embargo list 800 may include a list of banned MAC addresses 810 of wireless STAs (e.g., MAC-x and MAC-z) that are banned from connecting to the wireless AP and recognized attack locations 820 (e.g., xx.xx and zz.zz). The wireless AP may store the embargo list in an embargo list database. The wireless AP may update the embargo list to add new attack locations and/or information associated with new wireless STAs that may not be allowed to connect to the wireless AP. The wireless AP may also update the embargo list to remove information, from the embargo list 800, associated with the wireless STAs that may now be allowed to connect to the wireless AP.

Figure 9:
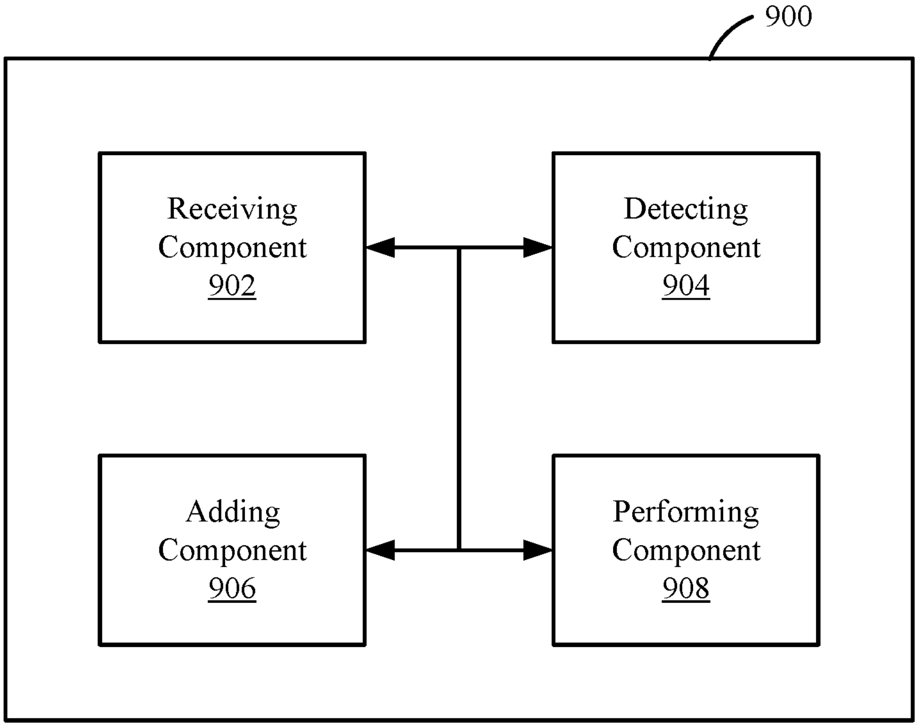
FIG. 9 shows a block diagram of an example wireless communication device such as a wireless AP that supports protecting the wireless AP from repeated attacks.

FIG. 9 shows a block diagram of a wireless communication device 900 such as a wireless AP that supports protecting the wireless AP from repeated attacks, according to some aspects of the present disclosure. In one example, the wireless communication device 900 is configured or operable to perform a process 400 described with reference to FIG. 4. In another example, the wireless communication device 900 is configured or operable to perform a process described with reference to FIGS. 5A-5C. In various examples, the wireless communication device 900 can be a chip, SoC, chipset, package or device that may include: one or more modems (such as a Wi-Fi (IEEE 802.11) modem or a cellular modem such as 3GPP 4G LTE or 5G compliant modem); one or more processors, processing blocks or processing elements (collectively "the processor"); one or more radios (collectively "the radio"); and one or more memories or memory blocks (collectively "the memory").

In some examples, the wireless communication device 900 can be a device for use in an AP, such as AP 102 described with reference to FIG. 1. In some other examples, the wireless communication device 900 can be an AP that includes such a chip, SoC, chipset, package or device as well as multiple antennas. The wireless communication device 900 is capable of transmitting and receiving wireless communications in the form of, for example, wireless packets. For example, the wireless communication device can be configured or operable to transmit and receive packets in the form of physical layer PPDUs and MPDUs conforming to one or more of the IEEE 802.11 family of wireless communication protocol standards. In some examples, the wireless communication device 900 also includes or can be coupled with an application processor which may be further coupled with another memory. In some examples, the wireless communication device 900 further includes at least one external network interface that enables communication with a core network or backhaul network to gain access to external networks including the Internet.

The wireless communication device 900 includes at least a receiving component 902, a detecting component 904, an adding component 906, and a performing component 908. Portions of one or more of the components 902, 904, 906, and 908 may be implemented at least in part in hardware or firmware. For example, the receiving component 902 may be implemented at least in part by a modem. In some examples, at least some of the components 902, 904, 906, and/or 908 are implemented at least in part by a processor and as software stored in a memory. For example, portions of one or more of the components 902, 904, 906, or 908 can be implemented as non-transitory instructions (or "code") executable by the processor to perform the functions or operations of the respective module.

In some implementations, the processor may be a component of a processing system. A processing system may generally refer to a system or series of machines or components that receives inputs and processes the inputs to produce a set of outputs (which may be passed to other systems or components of, for example, the wireless communication device 900). For example, a processing system of the wireless communication device 900 may refer to a system including the various other components or subcomponents of the wireless communication device 900, such as the processor, or a transceiver, or a communications manager, or other components or combinations of components of the wireless communication device 900. The processing system of the wireless communication device 900 may interface with other components of the wireless communication device 900, and may process information received from other components (such as inputs or signals) or output information to other components. For example, a chip or modem of the wireless communication device 900 may include a processing system, a first interface to output information and a second interface to obtain information. In some implementations, the first interface may refer to an interface between the processing system of the chip or modem and a transmitter, such that the wireless communication device 900 may transmit information output from the chip or modem. In some implementations, the second interface may refer to an interface between the processing system of the chip or modem and a receiver, such that the wireless communication device 900 may obtain information or signal inputs, and the information may be passed to the processing system. A person having ordinary skill in the art will readily recognize that the first interface also may obtain information or signal inputs, and the second interface also may output information or signal outputs.

The receiving component 902 is capable of, configured to, or operable to at least receive multiple incorrect security credential inputs from a wireless station to connect to the wireless AP.

The detecting component 904 is capable of, configured to, or operable to at least detect that a number of consecutive incorrect security credential inputs exceeds a threshold.

The adding component 906 is capable of, configured to, or operable to at least add the one or more MAC addresses to an embargo list including a list of banned MAC addresses based on the number of consecutive incorrect security credential inputs exceeding the threshold.

The performing component 908 is capable of, configured to, or operable to at least perform one or more actions to block one or more other security credential inputs from the wireless station to connect to the wireless AP.

EXAMPLE CLAUSES

Implementation examples are described in the following numbered clauses:

Clause 1: A method for wireless communication performable at a wireless access point (AP), including: receiving multiple incorrect security credential inputs from a wireless station to connect to the wireless AP, where the multiple incorrect security credential inputs are associated with one or more media access control (MAC) addresses of the wireless station; detecting that a number of consecutive incorrect security credential inputs exceeds a threshold; adding the one or more MAC addresses to an embargo list including a list of banned MAC addresses based on the number of consecutive incorrect security credential inputs exceeding the threshold; and performing one or more actions to block one or more other security credential inputs from the wireless station to connect to the wireless AP.

Clause 2: The method of clause 1, where the performing of the one or more actions further includes disabling an input field on the wireless station to prevent entry of the one or more other security credential inputs to connect to the wireless AP.

Clause 3: The method of clause 1, where the performing of the one or more actions further includes generating an alert tone based on the number of consecutive incorrect security credential inputs exceeding the threshold.

Clause 4: The method of clause 1, where the performing of the one or more actions further includes transmitting an alert message to a wireless device of an administrator of the wireless AP based on the number of consecutive incorrect security credential inputs exceeding the threshold, where the alert message includes data associated with the number of consecutive incorrect security credential inputs.

Clause 5: The method of clause 1, where: the receiving includes receiving a first incorrect security credential input of the multiple incorrect security credential inputs from the wireless station; and adding a first delay time period for entry of another security credential input in an input field on the wireless station.

Clause 6: The method of clause 5, where: the receiving includes receiving a second incorrect security credential input of the multiple incorrect security credential inputs from the wireless station after the first delay time period; and adding a second delay time period for entry of another security credential input in the input field on the wireless station, where the second delay time period has a non-zero value and is a higher value than the first delay time period.

Clause 7: The method of clause 6, where: the receiving includes receiving a third incorrect security credential input of the multiple incorrect security credential inputs from the wireless station after the second delay time period; and adding a third delay time period for entry of another security credential input in the input field on the wireless station, where a value of the third delay time period is a higher value than a value of the second delay time period.

Clause 8: The method of clause 1, further including determining a location of the wireless station, using at least one of: a round trip time (RTT) measurement or an angle of arrival (AoA) measurement, based on one or more of the multiple incorrect security credential inputs received from the wireless station.

Clause 9: The method of clause 8, further including blocking one or more subsequent security credential inputs received from each wireless station located at the determined location to prevent connection to the wireless AP based on the number of consecutive incorrect security credential inputs exceeding the threshold.

Clause 10: The method of clause 8, further including: adding the determined location of the wireless STA to the embargo list in addition to the one or more MAC addresses based on the number of consecutive incorrect security credential inputs exceeding the threshold.

Clause 11: The method of clause 1, further including: receiving, from the wireless station associated with a first MAC address, a first connection request to connect to the wireless AP; determining a first location of the wireless station, using at least one of: a round trip time (RTT) measurement or an angle of arrival (AoA) measurement, based on the first connection request; and determining whether at least one of the first MAC address or the first location is in an allow list including a list of approved MAC addresses and corresponding locations.

Clause 12: The method of clause 11, further including: presenting an input field on the wireless station for entry of a first security credential input based on at least one of the first MAC address or the first location being within the allow list; receiving the first security credential input from the wireless station to connect to the wireless AP; and connecting with the wireless station based on the first security credential input being correct.

Clause 13: The method of clause 12, further including: adding the first MAC address and the first location of the wireless station in the embargo list based on the first security credential input being incorrect.

Clause 14: The method of clause 1, further including: receiving, from the wireless station associated with a first MAC address, a first connection request to connect to the wireless AP; determining a first location of the wireless station, using at least one of: a round trip time (RTT) measurement or an angle of arrival (AoA) measurement, based on the first connection request; and determining whether the first MAC address and the first location are within the embargo list.

Clause 15: The method of clause 14, further including: causing an input field to be presented on the wireless station for entry of a first security credential input to connect to the wireless AP, based on the first MAC address and the first location not being within the embargo list; receiving the first security credential input from the wireless station to connect to the wireless AP; and connecting with the wireless station, based on the first security credential input being correct.

Clause 16: The method of clause 15, further including: adding the first MAC address and the first location of the wireless station to a candidate embargo list, based on the first security credential input being incorrect.

Clause 17: The method of clause 16, further including: receiving one or more additional security credential inputs from the wireless station to connect to the wireless AP; and adding the first MAC address and the first location of the wireless station in the embargo list, based on the one or more additional security credential inputs received from the wireless station being incorrect and the number of consecutive incorrect security credential inputs exceeding the threshold.

Clause 18: An apparatus, including: a memory including executable instructions; and a processor configured to execute the executable instructions and cause the apparatus to perform a method in accordance with any one of Clauses 1-17.

Clause 19: An apparatus, including means for performing a method in accordance with any one of Clauses 1-17.

Clause 20: A non-transitory computer-readable medium including executable instructions that, when executed by a processor of an apparatus, cause the apparatus to perform a method in accordance with any one of Clauses 1-17.

Clause 21: A computer program product embodied on a computer-readable storage medium including code for performing a method in accordance with any one of Clauses 1-17.

ADDITIONAL CONSIDERATIONS

As used herein, the term "determine" or "determining" encompasses a wide variety of actions and, therefore, "determining" can include calculating, computing, processing, deriving, investigating, looking up (such as via looking up in a table, a database or another data structure), inferring, ascertaining, measuring, and the like. Also, "determining" can include receiving (such as receiving information), accessing (such as accessing data stored in memory), transmitting (such as transmitting information) and the like. Also, "determining" can include resolving, selecting, obtaining, choosing, establishing and other such similar actions.

As used herein, a phrase referring to "at least one of" a list of items refers to any combination of those items, including single members. As an example, "at least one of: a, b, or c" is intended to cover: a, b, c, a-b, a-c, b-c, and a-b-c. As used herein, "or" is intended to be interpreted in the inclusive sense, unless otherwise explicitly indicated. For example, "a or b" may include a only, b only, or a combination of a and b.

As used herein, "based on" is intended to be interpreted in the inclusive sense, unless otherwise explicitly indicated. For example, "based on" may be used interchangeably with "based at least in part on." "associated with", or "in accordance with" unless otherwise explicitly indicated. Specifically, unless a phrase refers to "based on only 'a,'" or the equivalent in context, whatever it is that is "based on 'a,'" or "based at least in part on 'a,'" may be based on "a" alone or based on a combination of "a" and one or more other factors, conditions or information.

The various illustrative components, logic, logical blocks, modules, circuits, operations and algorithm processes described in connection with the examples disclosed herein may be implemented as electronic hardware, firmware, software, or combinations of hardware, firmware or software, including the structures disclosed in this specification and the structural equivalents thereof. The interchangeability of hardware, firmware and software has been described generally, in terms of functionality, and illustrated in the various illustrative components, blocks, modules, circuits and processes described above. Whether such functionality is implemented in hardware, firmware or software depends upon the particular application and design constraints imposed on the overall system.

Various modifications to the examples described in this disclosure may be readily apparent to persons having ordinary skill in the art, and the generic principles defined herein may be applied to other examples without departing from the spirit or scope of this disclosure. Thus, the claims are not intended to be limited to the examples shown herein, but are to be accorded the widest scope consistent with this disclosure, the principles and the novel features disclosed herein.

Additionally, various features that are described in this specification in the context of separate examples also can be implemented in combination in a single implementation. Conversely, various features that are described in the context of a single implementation also can be implemented in multiple examples separately or in any suitable subcombination. As such, although features may be described above as acting in particular combinations, and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one or more example processes in the form of a flowchart or flow diagram. However, other operations that are not depicted can be incorporated in the example processes that are schematically illustrated. For example, one or more additional operations can be performed before, after, simultaneously, or between any of the illustrated operations. In some circumstances, multitasking and parallel processing may be advantageous. Moreover, the separation of various system components in the examples described above should not be understood as requiring such separation in all examples, and it should be understood that the described program components and systems can generally be integrated together in a single software product or packaged into multiple software products.

What is claimed is:

1. A wireless access point (AP), comprising:

at least one memory;

at least one processor communicatively coupled with the at least one memory, the at least one processor operable to cause the wireless AP to:

receive a first incorrect security credential input from a wireless station (STA) to connect to the wireless AP;

add a first delay time period for entry of another security credential input in an input field on the wireless STA;

receive a second incorrect security credential input from the wireless STA after the first delay time period;

add a second delay time period for entry of another security credential input in the input field on the wireless STA, wherein the second delay time period has a non-zero value and is a higher value than the first delay time period;

receive one or more additional incorrect security credential inputs from the wireless STA to connect to the wireless AP, wherein the first incorrect security credential input, the second incorrect security credential input, and the one or more additional incorrect security credential inputs comprise multiple incorrect security credential inputs associated with one or more media access control (MAC) addresses of the wireless STA;

detect that a number of consecutive incorrect security credential inputs exceeds a threshold;

add the one or more MAC addresses and a location of the wireless STA to an embargo list comprising a list of banned MAC addresses and locations based on the number of consecutive incorrect security credential inputs exceeding the threshold; and perform one or more actions to block one or more other security credential inputs from each other wireless STA located at and near the location of the wireless STA to connect to the wireless AP, wherein to perform the one or more actions, the at least one processor is further operable to cause the wireless AP to transmit an alert message to a wireless device of an administrator of the wireless AP based on the number of consecutive incorrect security credential inputs exceeding the threshold, wherein the alert message comprises data associated with the number of consecutive incorrect security credential inputs and the one or more MAC addresses associated with the multiple incorrect security credential inputs.

2. The wireless AP of claim 1, wherein the at least one processor, to perform the one or more actions, is further operable to disable an input field on the wireless STA to prevent entry of the one or more other security credential inputs to connect to the wireless AP.

3. The wireless AP of claim 1, wherein the at least one processor, to perform the one or more actions, is further operable to cause the wireless AP to generate an alert tone based on the number of consecutive incorrect security credential inputs exceeding the threshold.

4. The wireless AP of claim 1, wherein the at least one processor is further operable to cause the wireless AP to:

receive a third incorrect security credential input of the multiple incorrect security credential inputs from the wireless STA after the second delay time period; and add a third delay time period for entry of another security credential input in the input field on the wireless STA, wherein a value of the third delay time period is a higher value than a value of the second delay time period.

5. The wireless AP of claim 1, wherein the at least one processor is further operable to cause the wireless AP to determine the location of the wireless STA, using at least one of: a round trip time (RTT) measurement or an angle of arrival (AoA) measurement, based on one or more of the multiple incorrect security credential inputs received from the wireless STA.

6. The wireless AP of claim 5, wherein the at least one processor, to perform the one or more actions, is further operable to cause the wireless AP to block one or more subsequent security credential inputs received from each wireless STA located at the determined location to prevent connection to the wireless AP based on the number of consecutive incorrect security credential inputs exceeding the threshold.

7. The wireless AP of claim 1, wherein the at least one processor is further operable to cause the wireless AP to:

receive, from the wireless STA associated with a first MAC address, a first connection request to connect to the wireless AP;

determine a first location of the wireless STA, using at least one of: a round trip time (RTT) measurement or an angle of arrival (AoA) measurement, based on the first connection request; and determine whether at least one of the first MAC address or the first location is in an allow list comprising a list of approved MAC addresses and corresponding locations.

8. The wireless AP of claim 7, wherein the at least one processor is further operable to cause the wireless AP to:

present an input field on the wireless STA for entry of a first security credential input, based on at least one of the first MAC address or the first location being within the allow list;

receive the first security credential input from the wireless STA to connect to the wireless AP; and connect with the wireless STA, based on the first security credential input being correct.

9. The wireless AP of claim 8, wherein the at least one processor is further operable to cause the wireless AP to:

add the first MAC address and the first location of the wireless STA in the embargo list, based on the first security credential input being incorrect.

10. The wireless AP of claim 1, wherein the at least one processor is further operable to cause the wireless AP to:

receive, from the wireless STA associated with a first MAC address, a first connection request to connect to the wireless AP;

determine a first location of the wireless STA, using at least one of: a round trip time (RTT) measurement or an angle of arrival (AoA) measurement, based on the first connection request; and determine whether the first MAC address and the first location are within the embargo list.

11. The wireless AP of claim 10, wherein the at least one processor is further operable to cause the wireless AP to:

cause an input field to be presented on the wireless STA for entry of a first security credential input to connect to the wireless AP, based on the first MAC address and the first location not being within the embargo list;

receive the first security credential input from the wireless STA to connect to the wireless AP; and connect with the wireless STA, based on the first security credential input being correct.

12. The wireless AP of claim 11, wherein the at least one processor is further operable to cause the wireless AP to:

add the first MAC address and the first location of the wireless STA to a candidate embargo list, based on the first security credential input being incorrect.

13. The wireless AP of claim 12, wherein the at least one processor is further operable to cause the wireless AP to:

receive one or more additional security credential inputs from the wireless STA to connect to the wireless AP; and add the first MAC address and the first location of the wireless STA to the embargo list, based on the one or more additional security credential inputs received from the wireless STA being incorrect and the number of consecutive incorrect security credential inputs exceeding the threshold.

14. A method for wireless communication performable at a wireless access point (AP), comprising:

receiving a first incorrect security credential input from a wireless station (STA) to connect to the wireless AP;

adding a first delay time period for entry of another security credential input in an input field on the wireless STA;

receiving a second incorrect security credential input from the wireless STA after the first delay time period;

adding a second delay time period for entry of another security credential input in the input field on the wireless STA, wherein the second delay time period has a non-zero value and is a higher value than the first delay time period;

receiving one or more additional incorrect security credential inputs from the wireless STA to connect to the wireless AP, wherein the first incorrect security credential input, the second incorrect security credential input, and the one or more additional incorrect security credential inputs comprise multiple incorrect security credential inputs associated with one or more media access control (MAC) addresses of the wireless STA;

detecting that a number of consecutive incorrect security credential inputs exceeds a threshold;

adding the one or more MAC addresses and a location of the wireless STA to an embargo list comprising a list of banned MAC addresses and locations based on the number of consecutive incorrect security credential inputs exceeding the threshold; and performing one or more actions to block one or more other security credential inputs from each other wireless STA located at and near the location of the wireless STA to connect to the wireless AP, wherein the performing of the one or more actions further comprises transmitting an alert message to a wireless device of an administrator of the wireless AP based on the number of consecutive incorrect security credential inputs exceeding the threshold, wherein the alert message comprises data associated with the number of consecutive incorrect security credential inputs and the one or more MAC addresses associated with the multiple incorrect security credential inputs.

15. The method of claim 14, wherein the performing of the one or more actions further comprises disabling an input field on the wireless STA to prevent entry of the one or more other security credential inputs to connect to the wireless AP.

16. The method of claim 14, the performing of the one or more actions further comprises generating an alert tone based on the number of consecutive incorrect security credential inputs exceeding the threshold.

17. The method of claim 14, wherein:

the receiving comprises receiving a third incorrect security credential input of the multiple incorrect security credential inputs from the wireless STA after the second delay time period; and adding a third delay time period for entry of another security credential input in the input field on the wireless STA, wherein a value of the third delay time period is a higher value than a value of the second delay time period.

18. The method of claim 14, further comprising determining the location of the wireless STA, using at least one of: a round trip time (RTT) measurement or an angle of arrival (AoA) measurement, based on one or more of the multiple incorrect security credential inputs received from the wireless STA.

19. The method of claim 18, further comprising blocking one or more subsequent security credential inputs received from each wireless STA located at the determined location to prevent connection to the wireless AP based on the number of consecutive incorrect security credential inputs exceeding the threshold.

20. The method of claim 14, further comprising:

receiving, from the wireless STA associated with a first MAC address, a first connection request to connect to the wireless AP;

determining a first location of the wireless STA, using at least one of: a round trip time (RTT) measurement or an angle of arrival (AoA) measurement, based on the first connection request; and determining whether at least one of the first MAC address or the first location is in an allow list comprising a list of approved MAC addresses and corresponding locations.

21. The method of claim 20, further comprising:

presenting an input field on the wireless STA for entry of a first security credential input based on at least one of the first MAC address or the first location being within the allow list;

receiving the first security credential input from the wireless STA to connect to the wireless AP; and connecting with the wireless STA based on the first security credential input being correct.

22. The method of claim 21, further comprising:

adding the first MAC address and the first location of the wireless STA in the embargo list based on the first security credential input being incorrect.

* * * * *